United States Patent [19]
Leather

[11] 4,339,172
[45] Jul. 13, 1982

[54] CONNECTOR HAVING A SINGLE SEGMENTED DEFORMABLE GRIP MEMBER FOR OPTICAL CABLES

[75] Inventor: Russell A. Leather, Perth, Scotland
[73] Assignee: Ferranti Limited, Cheadle, England
[21] Appl. No.: 135,632
[22] Filed: Mar. 31, 1980

[30] Foreign Application Priority Data

Mar. 31, 1979 [GB] United Kingdom ............... 7911357

[51] Int. Cl.³ .............................................. G02B 5/172
[52] U.S. Cl. ................................................. 350/96.21
[58] Field of Search ............... 350/96.20, 96.21, 96.22

[56] References Cited

U.S. PATENT DOCUMENTS

| 3,982,815 | 9/1976 | Nakayama | 350/96.22 |
| 4,114,979 | 9/1978 | Heldt | 350/96.21 |
| 4,223,979 | 9/1980 | Piter | 350/96.21 |

FOREIGN PATENT DOCUMENTS

| 2237445 | 2/1974 | Fed. Rep. of Germany | 350/96.21 |
| 2553877 | 6/1976 | Fed. Rep. of Germany | 350/96.22 |
| 2800930 | 7/1978 | Fed. Rep. of Germany | 350/96.23 |
| 52-16240 | 2/1977 | Japan | 350/96.21 |

OTHER PUBLICATIONS

L. A. Price II, J. R. Statkevicus "Fiber-Optic Male Connector" IBM Technical Disclosure Bulletin vol. 22, No. 10, Mar. 1980.

*Primary Examiner*—John K. Corbin
*Assistant Examiner*—Frank Gonzalez
*Attorney, Agent, or Firm*—Kerkam, Stowell, Kondracki & Clarke

[57] ABSTRACT

A connector for a light-transmitting cable 13 comprises a body member 10 in which are located a sleeve 11 of elastomeric material and a grip member 12. The grip member is segmented and deformable under radial pressure applied by the sleeve. The ends of two cables 13 may be inserted into the grip member 12 and means 15 are provided for applying axial pressure to the elastomeric sleeve 11 to cause it to extend in a radial direction to exert pressure on the grip member. The grip member 12 then grips the cable 13 at a number of equally-spaced points around its periphery.

6 Claims, 12 Drawing Figures

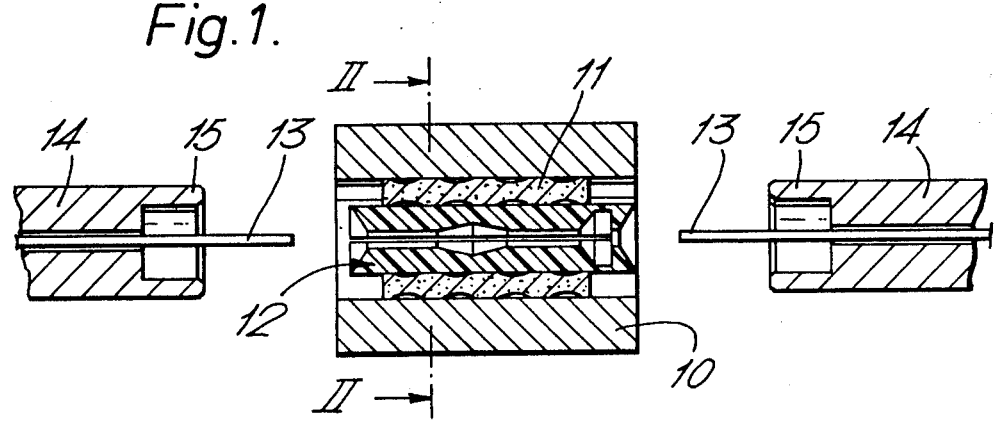
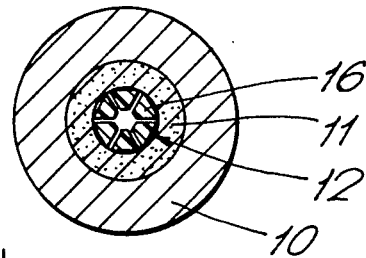
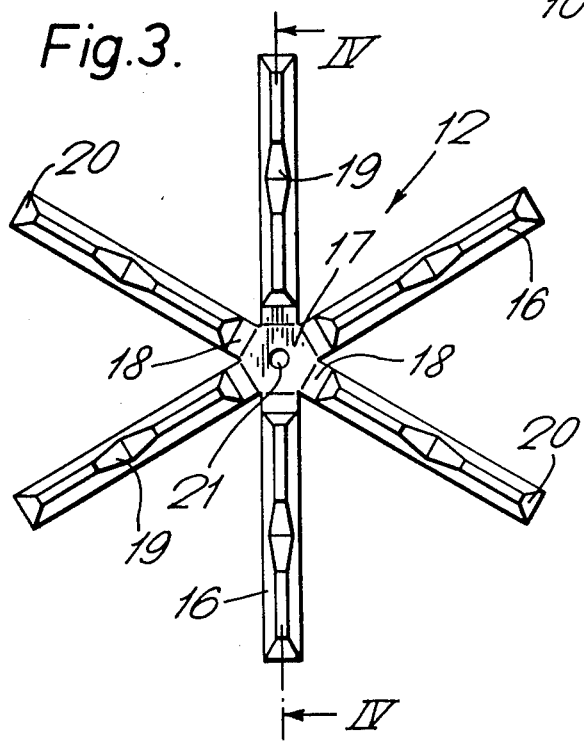
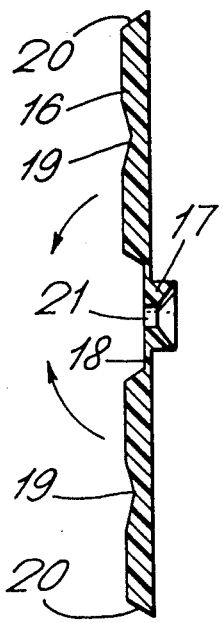

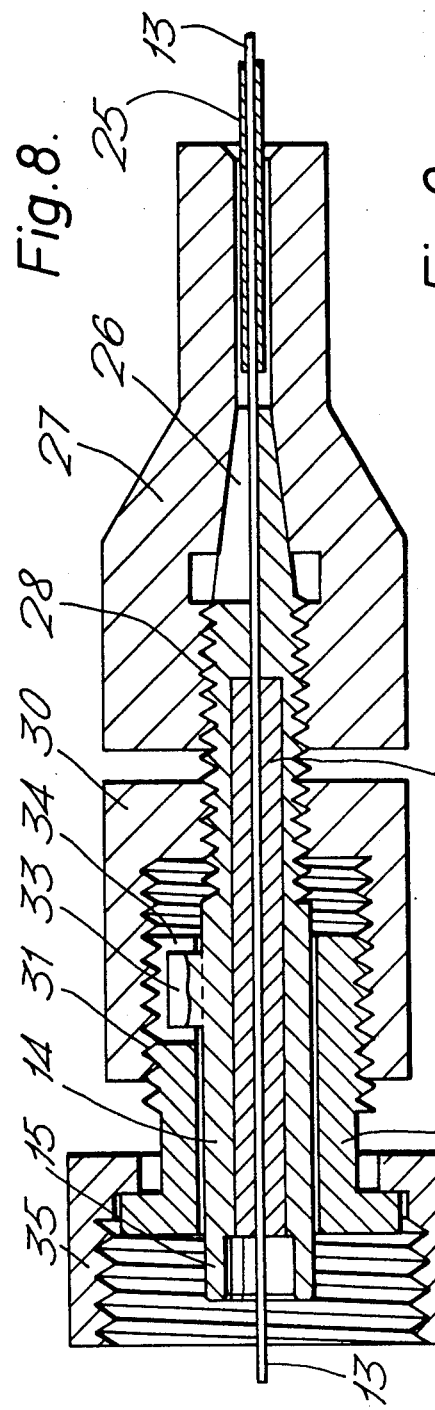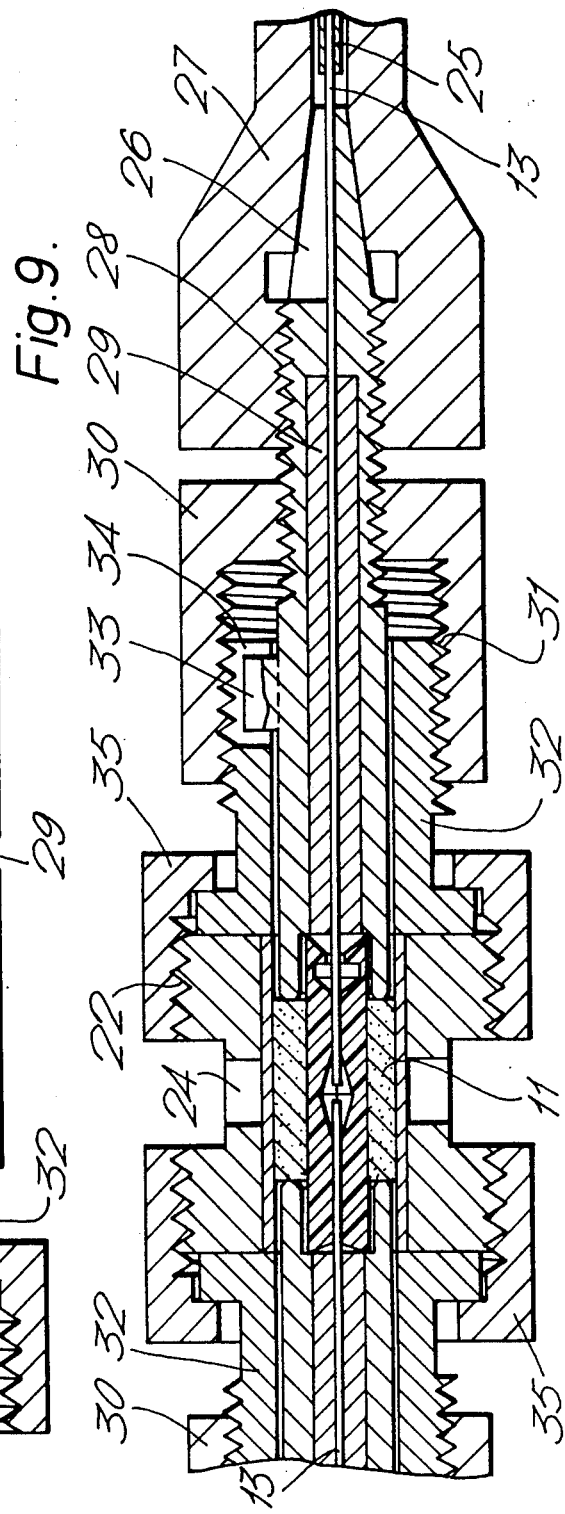

CONNECTOR HAVING A SINGLE SEGMENTED DEFORMABLE GRIP MEMBER FOR OPTICAL CABLES

This invention relates to a connector for optical cables. Optical cables are being used increasingly for communication purposes, and comprise one or more optical fibres each made up from a core through which light of a suitable wavelength is transmitted and a surrounding cladding of a material having a lower refractive index. In this way the light is reflected from the interface between the core and the cladding and passes along the fibre with little attenuation. The individual fibres may be very thin, a typical diameter being of the order of 125 microns overall, with a core diameter of 60 microns. Thicker fibres or bundles of fibres may be used, but suffer from a number of disadvantages such as increased cost and larger bending radius.

As with any other form of signal conductor, optical cables require joining, and many types of connector have been devised. When using a separable connector, it is preferred to separate the end of the fibres by a short gap, and to polish or otherwise prepare the exposed ends of the fibres. The gap should, however, be as small as possible to avoid loss, yet sufficient to prevent the ends from touching and damaging the prepared surfaces. In a connector therefore it is necessary to ensure accurate axial alignment, maintain a constant spacing between the ends, and to reduce angular misalignments of the axes of the two ends to a minimum.

It is therefore an object of the invention to provide a connector for optical cables which satisfies the above requirements.

According to the present invention there is provided a connector for connecting together two optical cables such that the optical axes of the adjacent ends of the cables are aligned with one another, which includes a body member having a bore of regular cross-section, a sleeve of elastomeric material located within the bore, a segmented deformable grip member located within the sleeve and into which the ends of the cables may be inserted, and means for applying axial compression forces to the sleeve so as to cause the grip member to contract in a radial direction and grip each of the cables at a number of equally-spaced points around its periphery.

Preferably the means for applying axial compression forces to the sleeve comprise projecting spigots shaped for insertion into the bore of the body member.

The projecting spigots may form part of a plug member arranged to cooperate with and be secured to the body member.

The invention will now be described with reference to the accompanying drawings, which illustrate various embodiments of a connector for single-fibre optical cables. In the drawings:

FIG. 1 is a sectional side view of a simple form of connector.

FIG. 2 is a sectional view along the line II—II of FIG. 1;

FIG. 3 is a front view of the grip member before its insertion into the connector;

FIG. 4 is a sectional view along the line IV—IV of FIG. 3;

FIG. 8 is a sectional side view of a practical form of plug member;

FIG. 9 is a sectional side view of an asembled connector;

Figure 5:
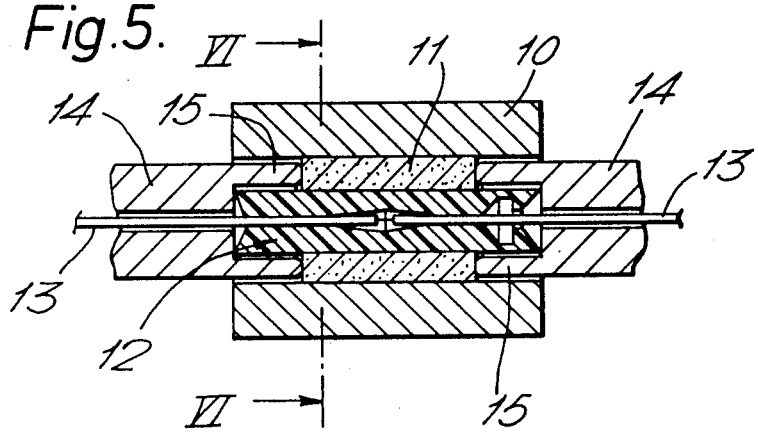
FIG. 5 is a sectional side view of the connector of FIG. 1 in its assembled condition.

Referring now to FIGS. 1 and 2, the connector includes a body member 10 in the form of a hollow cylinder. Fitted inside the bore of the cylinder is a sleeve 11 of elastomeric material. A segmented grip member 12 is located inside the sleeve 11 and is held in position by the elasticity of the sleeve. Arranged to cooperate with the body member are two optical fibre cables 13, each surrounded by a guard member 14 having it end formed into an annular spigot 15, the bore of which is greater than the diameter of the grip member 12.

The construction of the grip member is shown more clearly in FIGS. 3 and 4. The grip member is formed by moulding in the flat shape shown in FIG. 3, which shows six arms 16 equally spaced about and integral with a common central retaining portion 17. Each of the arms is of substantially trapezoidal cross-section as shown in FIG. 2, and is joined to the retaining portion 17 by a flexible region 18. Each arm is recessed at its centre 19 and has a chamfer 20 formed on its outer end. A central hole 21 is formed into the required shape by folding each arm 16 through 90° in the directions shown by the arrows in FIG. 4, so that it may be inserted into the sleeve 11 as shown in FIGS. 1 and 2.

Figure 6:
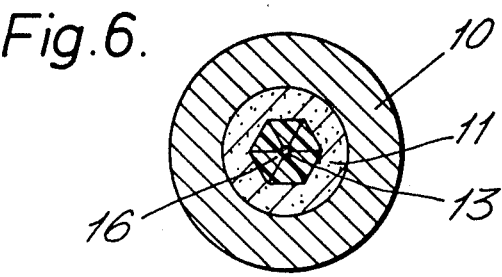
FIG. 6 is a sectional view along the line VI—VI of FIG. 5.

FIGS. 5 and 6 show the assembled connector. The insertion of each optical fibre 13 into the centre of the grip member brings the spigots 15 into contact with the elastic sleeve 11, and the application of axial pressure on this sleeve by the two spigots causes the sleeve to contract in an axial direction and expand in a radial direction, mainly towards the centre. The radial expansion of the sleeve 11 compresses the arms 16 of the grip member 12 around the optical fibres 13 so that each is gripped by the arms 12. The points of contact between the arms 16 and the optical fibres 13 are equally spaced around the periphery of the fibre. The relative dimensions of the component parts are such that when the connector is assembled the ends of the two optical fibres 13 are separated by the necessary very small gap. The recessed centre portion 19 of each arm and the chamfers 20 avoid damage to the ends of the optical fibres as these are inserted into the grip member 12. Because of the symmetrical shape of the grip member 12 the two optical fibres 13 are maintained in axial alignment with one another, even if their diameters are different, provided that each of the arms of the grip member is free to contact the two fibres simultaneously.

Figure 7:
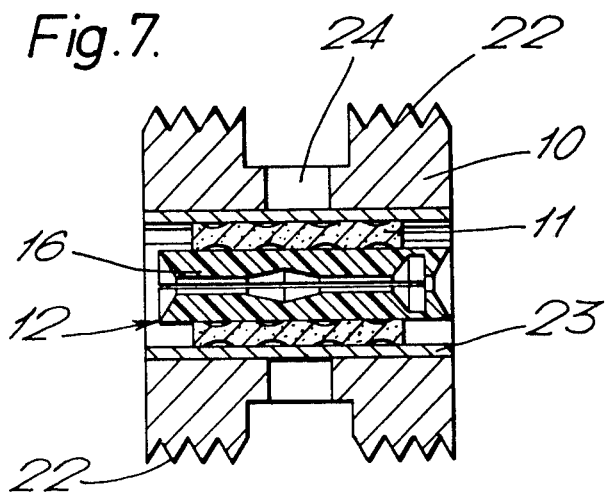
FIG. 7 is a sectional side-view of a practical form of body member.

As will be clear from the above description, a practical form of the connector must include additional features, such as means for retaining the various parts in contact with one another. Fibres 7,8 and 9 illustrate an embodiment with such refinements. Referring to FIG. 7, the body member 10 is modified by the formation of threaded portions 22 on its outer surface. A thin tube 23 is placed between the inner surface of the body 10 and the elastic sleeve 11, for a purpose to be described later. Two diametrically-opposed holes 24 are formed through the body member. Otherwise, the construction of the body member is very similar to that of FIG. 1.

The body member of FIG. 7 may be considered as the socket part of the connector, with the two parts carrying the optical fibres being cooperating plugs. One of these plugs is shown in detail in FIG. 8. The optical fibre 13 has a protective covering 25, which is stripped off the fibre inside the plug. The fibre is gripped inside the plug by a split collet 26 and locking nut 27. The nut 27 screws onto a threaded portion 28 of the guard member 14. As shown in FIG. 8 a tube 29 may be inserted into the centre of the guard member 14 to support the optical fibre 13 more accurately. A nut 30 is threaded to fit on the portion 28 of the guard member 14, and also carries thread 31 of the same sense and slightly different pitch which engages a threaded housing 32. The guard member 14 carries a projection 33 which is located in a slot 34 in housing 32 to prevent relative rotation of the guard member 14 and housing 32. Housing 32 also carries a captive nut 35 threaded to engage the threaded portions 22 of the body member 10.

FIG. 9 shows the assembled connector, with the socket and parts of two cooperating plugs.

The nut 30, guard member 14 and housing 32 operate together as a differential screw so that the length of the optical fibre 13 projecting from the plug may be finely adjusted. Adjustment by means of a normal thread would not be sufficiently fine. Since the pitches of the two threads on nut 30 are slightly different the desired fine adjustment may be made. If the housing 32 is held stationary and nut 30 is rotated in a clockwise direction (looking from the right in FIG. 8) relative to the guard member 14, then the nut 30 will move to the left whilst the housing 32 moves to the right. If, by way of example, the pitch of thread 28 is 0.5 mm, and that of thread 31 is 0.6 mm, then the differential movement resulting from one complete turn of nut 30 will be 0.1 mm. Hence adjustment to a high degree of accuracy is possible by this means.

Figure 10:
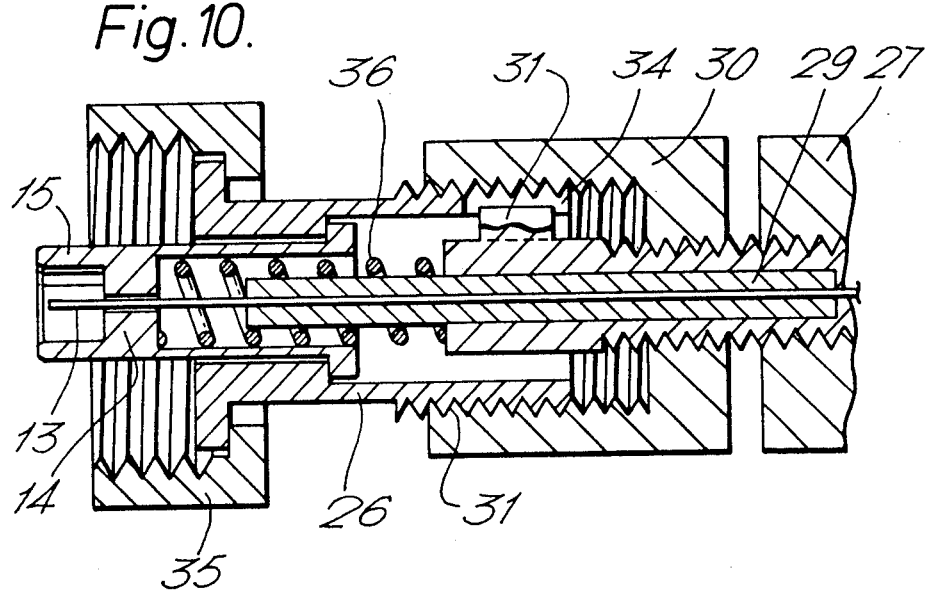
FIG. 10 is a sectional side view of an alternative form of plug member.
Figure 11:
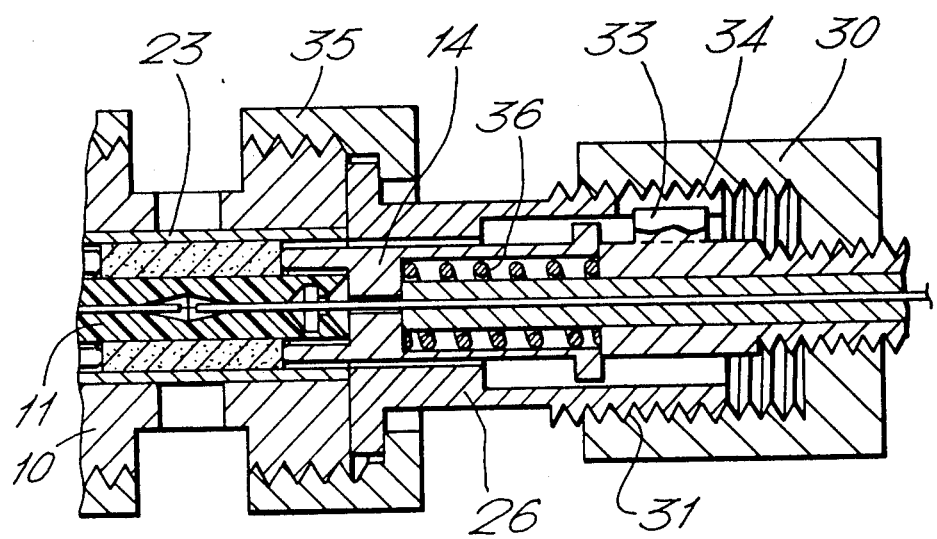
FIG. 11 is a sectional side view of an assembled connector using the plug member of FIG. 10.

One of the problems associated with the plug of FIG. 8 is that the end of the optical fibre 13 is exposed, and hence liable to damage. One way of protecting this is by means of an insert, say of a plastics material, which may be pushed into the captive nut 35 when the plug is disconnected. These inserts are liable to be dislodged or lost, and hence this solution is not entirely satisfactory. FIGS. 10 and 11 illustrate a solution to this problem. In the embodiment of FIG. 10 the guard member of the previous embodiments is split into two parts. The inner part carries thread 28 as before, with which nut 30 engages. The other part, forming the guard member 14, is urged away from the inner part by a spring 36, and is of such dimensions that the end of the optical fibre 13 is completely shielded when the plug is free. In this position the guard member 14 is supported inside the housing 26 whilst the spring 36 fits around the inner tube 29. When the connector is assembled, the spigot 15 of the guard member meets the sleeve 11 in the body member, and further movement of the plug towards the body member simply compresses the spring 36. This movement stops when the guard member 14 abuts the inner portions, and further movement of the plug causes compression of the elastic sleeve 11 in the body member.

Although, as has already been explained, it is possible to adjust the length of the optical fibre 13 inserted into the grip member 12 with considerable accuracy, this does not in itself ensure that the gap between the ends of the two fibres inserted into the body member is of the correct dimensions or in the centre of the grip member.

Figure 12:
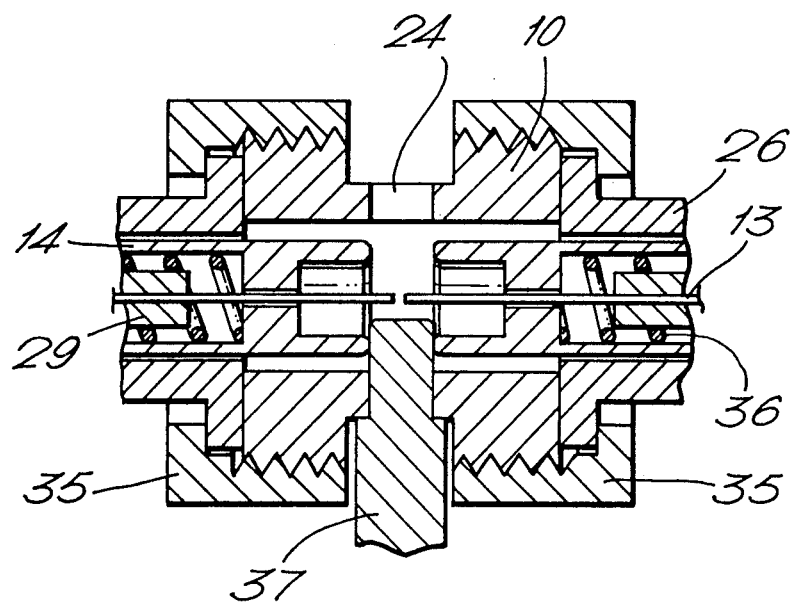
FIG. 12 illustrates a feature of the construction of FIG. 11.

FIG. 12 illustrates how the gap may be inspected visually. This does not need to be done every time that a connection is made, but should be done each time two particular plugs are used with a body member. As shown in FIG. 12 it is necessary to remove the tube 23 containing the elastic sleeve 11 and grip member 12 from the body member 10. In the case of the plug members shown in FIG. 12, which have the spring-loaded guard member 14, it is necessary to keep these from meeting in the centre of the bore in the body member. This is achieved by inserting a plug 37 into one of the holes 24 in the body member. The gap between the fibres 13 may then be inspected through the other hole 24, using a low-powered microscope if necessary. The plug 37 may be transparent or translucent and may be used to introduce light into the cavity to ease this inspection. The end face of plug 37 may be provided with lines to aid alignment. Alternatively a graticule may be provided in the microscope.

In the case of the embodiment in which the guard member 14 is not spring-loaded, then the plug 37 is not necessary. The guard members of the two plugs will take up the positions shown in FIG. 9 even when the elastic sleeve 11 is absent, enabling inspection to be made.

Various features of the embodiments described above may be modified without departing from the essential characteristics of the invention. The form of the grip member may be varied, in particular the number and shape of the arms. There must be at least three arms, though it is not essential that these should almost completely surround the fibre when clamped to it. Similarly the cross-section of the arms may be varied from the trapezoidal cross-section referred to above.

The body member may be varied in form particularly in respect of the means for securing the plugs to the body member. Other securing means than screw threads may be used. The inner sleeve 23 is necessary in the embodiments described above because of the presence of the inspection holes 24. If these holes are absent then the sleeve may be omitted, as in the basic embodiment of FIG. 1.

In all cases the light-transmitting cable may be a single fibre or a bundle of fibres.

What we claim is:

1. A connector for connecting together two light-transmitting cables such that the optical axes of the adjacent ends of the cables are aligned with one another, which includes a body member having a bore of regular cross-section, a sleeve of elastomeric material located within the bore, a single segmented deformable grip member located within the sleeve and into which the ends of both of the cables may be inserted, and means for applying axial compression forces to the sleeve so as to cause the grip member to contract in a radial direction and grip each of the cables at a number of equally-spaced points around its periphery so as to maintain the ends of the cables in axial alignment.

2. A connector as claimed in claim 1, the means for applying axial compression to the sleeve comprise projecting spigots shaped for insertion into the bore in the body member, the projecting spigots form parts of a plug member arranged to cooperate with and be secured to the body member, and the body member is arranged to cooperate with two plug members, each carrying a separate one of the light-transmitting cables.

3. A connector as claimed in claim 1, the means for applying axial compression to the sleeve comprise projecting spigots shaped for insertion into the bore in the body member and the projecting spigots are spring-loaded to protect the end of the cable when the plug member is detached from the body member.

4. A connector as claimed in claim 1 in which the grip member comprises at least three arms extending from a common retaining portion so as to lie parallel to one another when located within the sleeve.

5. A connector as claimed in claim 4 in which the grip member comprises a number of arms sufficient to substantially surround the cable when in contact therewith.

6. A connector as claimed in claim 1 which the grip member is moulded with flexible regions joining each arm to the common retaining portion.

* * * * *